(12) United States Patent
Eng

(10) Patent No.: US 8,199,684 B2
(45) Date of Patent: Jun. 12, 2012

(54) BROADBAND LOCAL AREA FULL-SERVICE BACKBONE NETWORK

(76) Inventor: John Wai-Tsang Eng, Westminster, CO (US)

( * ) Notice: Subject to any disclaimer, the term of this patent is extended or adjusted under 35 U.S.C. 154(b) by 1716 days.

(21) Appl. No.: 10/908,405

(22) Filed: May 11, 2005

(65) Prior Publication Data

US 2006/0256799 A1    Nov. 16, 2006

(51) Int. Cl.
*H04L 5/00* (2006.01)
(52) U.S. Cl. .................................... 370/297; 370/480
(58) Field of Classification Search .................. None
See application file for complete search history.

(56) References Cited

U.S. PATENT DOCUMENTS

| | | | | |
|---|---|---|---|---|
| 4,500,989 | A | 2/1985 | Dahod | 370/85 |
| 5,471,474 | A | 11/1995 | Grobicki | 370/85 |
| 6,813,238 | B1 * | 11/2004 | Otani et al. | 370/216 |
| 6,941,576 | B2 * | 9/2005 | Amit | 725/143 |
| 7,007,296 | B2 * | 2/2006 | Rakib | 725/111 |
| 7,043,750 | B2 * | 5/2006 | Ina | 725/131 |
| 7,221,712 | B1 * | 5/2007 | Schwartzman et al. | 375/257 |
| 7,298,762 | B2 * | 11/2007 | Rakib | 370/468 |
| 2002/0116720 | A1 | 8/2002 | Terry | 725/118 |
| 2002/0166124 | A1 | 11/2002 | Gurantz | 725/78 |
| 2003/0035442 | A1 | 2/2003 | Eng | 370/486 |
| 2003/0163831 | A1 * | 8/2003 | Gall et al. | 725/127 |
| 2004/0244043 | A1 | 12/2004 | Lind | 725/111 |
| 2005/0010962 | A1 * | 1/2005 | Bugajski et al. | 725/126 |
| 2005/0030910 | A1 | 2/2005 | Robertson | 370/276 |
| 2005/0034159 | A1 | 2/2005 | Ophir | 725/78 |
| 2005/0083856 | A1 | 4/2005 | Morelli | 370/254 |
| 2005/0283815 | A1 * | 12/2005 | Brooks et al. | 725/126 |
| 2007/0061854 | A1 * | 3/2007 | Albag et al. | 725/95 |
| 2007/0274730 | A1 * | 11/2007 | Koo et al. | 398/163 |

* cited by examiner

*Primary Examiner* — Kevin C Harper
*Assistant Examiner* — Rhonda Murphy

(57) ABSTRACT

A point-to-multipoint broadband local area network (BLAN) system comprising a local area modem controller (LAMC) and plurality of local area modems (LAMs) is capable of voice, video and data communications. The medium is capable of reliably supporting multiple downstream and upstream channels to meet the need of high-capacity and QoS of digital entertainment. Media-access-control (MAC) functions in the LAMC and the LAMs coordinate packet stream transmissions. The shared medium can be a tree-branch coaxial cable; the LAMs can be legacy DOCSIS or Euro-DOCSIS cable modems or enhanced cable modems with multiple channels; the MAC can be a DOCSIS MAC or an enhanced multi-channel full-service MAC (fsMAC). The physical layer of each channel can be that of DOCSIS, wideband, or other technologies. Residential gateway and wide-area broadband modem functions can also be incorporated into the LAMC. Cable TV programming channels and the BLAN can shared the same cable spectrum.

19 Claims, 5 Drawing Sheets

BROADBAND LOCAL AREA FULL-SERVICE BACKBONE NETWORK

This application incorporates by reference the teachings of U.S. patent application Ser. No. 10/122,828 "FULL-SERVICE BROADBAND CABLE MODEM SYSTEM" filed by the same inventor of this application, published Feb. 20, 2003 for details of full-service cable modem (fsCM) systems and full-service media-access-control (fsMAC).

BACKGROUND OF THE INVENTION

1. Technical Field of the Invention

This invention related to the field of multi-channel point-to-multipoint local area network communications method and apparatus supporting voice, video and data. It generally applies to shared wired-medium such as, but not limited to, coaxial cable.

2. Prior Art

There is an increasing need for a home backbone network with enough capacity and managed quality-of-service to serve multiple high-definition audio-visual streams as well as other voice, music, and data traffic generated by Internet appliances such as personal computers, printers, media servers, MP3 players, high-definition personal video recorders, wireless LAN (local area network) and wireless PAN (personal area network) access points.

Broadband coax medium has the advantages of ubiquity and intrinsic high bandwidth (in Gbps), especially suitable for such a home backbone network, comparing to other "no new wire" media such as wireless, unshielded twisted-pair telephone wires, or power-line.

Broadband point-to-multipoint multiple access networks using coaxial cable as a medium are described in [1 Dahod] U.S. Pat. No. 4,500,989 "DIGITAL COMMUNICATION SYSTEM" issued to Dahod, [2 Grobicki] U.S. Pat. No. 5,471,474 "COMMUNICATIONS HIGHWAY NETWORK SYSTEM" issued to Grobicki et al., [3 DOCSIS] CM-SP-RFIv2.0-I08-050408 "DOCSIS 2.0 SPECIFICATION" available on www.cablemodem.com/downloads/specs/, [4 Terry] U.S. patent application Ser. No. 10/071,007 "MULTI-BAND COAX EXTENDER FOR IN-BUILDING DIGITAL COMMUNICATION SYSTEMS" filed by Terry et al., [5 Gurantz] U.S. patent application Ser. No. 09/910,412 "NETWORK INTERFACE DEVICE AND BROADBAND LOCAL AREA NETWORK USING COAXIAL CABLE" filed by Gurantz et al., [6 Morelli] U.S. patent application Ser. No. 10/852,002 "NETWORKING METHODS AND APPARATUS" filed by Morelli et al., [7 Ophir] U.S. patent application Ser. No. 10/935,963 "IMPLEMENTING A HYBRID WIRELESS AND COAXIAL CABLE NETWORK" filed by Ophir et al., [8 Robertson] U.S. patent application Ser. No. 10/924,077 "FULL DUPLEX WIDEBAND COMMUNICATIONS SYSTEM FOR A LOCAL COAXIAL NETWORK" filed by Robertson et al., [9 Eng] U.S. patent application Ser. No. 10/122,828 "FULL-SERVICE BROADBAND CABLE MODEM SYSTEM" filed by the same inventor of this invention, and [10 Lind] U.S. patent application Ser. No. 10/446,511 "WIDEBAND DOCSIS ON CATV SYSTEMS USING PORT-TRUNKING" filed by Lind et al., each of which is incorporated herein by reference.

[1 Dahod][2 Grobicki] [6 Morelli] disclosed the using of a frequency translator at the root of the coaxial cable topology to reflect upstream transmissions back to all stations. [5 Gurantz] disclosed a method of using a non-matching filter to reflect upstream transmissions back to all stations. [4 Terry][6 Morelli][7 Ophir] used spectrum above 750 MHz for upstream and downstream channels to avoid conflict with the spectrum used by conventional cable TV programming channels. [7 Ophir] disclosed a way to use coaxial cable to extend the reach of wireless LAN transmission. [8 Robertson] described a coaxial home network that used channels above 750 MHz for full-duplex point-to-point communications between two stations.

[3 DOCSIS] disclosed the data-over-cable standards for a sub-split hybrid fiber-coaxial (HFC) cable infrastructure with a centralized controller (cable modem termination system, CMTS) residing at the root of the coaxial cable topology with a media-access-control (MAC) for coordinating the forwarding of packets to and from a plurality of cable modems. While [3 DOCSIS] has a robust MAC layer and the intelligence at the headend, and enjoys a consumer level pricing for the large volume of cable modems, it is nevertheless designed for metropolitan area operations for service providers; the CMTS is prohibitively expensive for residential consumer use. Moreover, the MAC is not scalable for providing the capacity for video operations.

[9 Eng] disclosed a multi-channel MAC called fsMAC (full-service MAC) that scales the network capacity of a data-over-HFC network by adding multiple upstream and downstream channels, with a DCPC-UCC (downstream control and payload channel—upstream control channel) control channel-pair for efficient upstream multiple access and high network capacity in both upstream and downstream directions.

[10 Lind] disclosed an enhancement to the DOCSIS MAC for adding wideband downstream and upstream channels to increase the capacity and burst rate of a DOCSIS HFC network.

Using the spectrum above conventional cable TV channels requires changes to the coaxial network. It is not compatible with legacy cable modems and cable set-top boxes (STBs) and increases the complexity and cost to the home networking infrastructure.

Therefore there is a need for an improved, reliable, high-capacity and low-cost broadband local area networking backbone for homes and premises to address the shortcomings of the prior art. It is desirable to take advantages of the legacy cable modem technology while providing the capacity and quality-of-service (QoS) required by multimedia communications of voice, video and data within the premises at consumer-level price.

BRIEF SUMMARY OF THE INVENTION

According to the teachings of the present invention, a point-to-multipoint broadband local area network (BLAN) system comprising a shared medium, a local area modem controller (LAMC) located at the root of the medium topology, and one or more in-building local area modems (LAMs) is capable of voice, video and data communications. The medium is capable of reliably supporting multiple downstream and upstream channels for the high-capacity need of digital entertainment such as multiple high-definition television audio-visual packet streams. Media-access-control (MAC) functions in the LAMC and the LAMs coordinate the packet stream transmissions to meet the quality-of-service requirements of multimedia communications. The physical layer (PHY) of each of the channels can be the PHY of DOCSIS or EuroDOCSIS, wide-band, ultra-wideband, OFDM, SDM or other technologies.

Other networking functions such as residential gateway (RG) can also be incorporated into the LAMC or provided externally. High-speed Internet access via a broadband modem including wide-area HFC cable modem, DSL modem, Fiber-to-the-Premises (FTTP) modem, two-way satellite modem, and fixed wireless modem, can be coupled to the LAMS via the external or internal RG.

The shared medium can be a tree-branch in-premises coaxial cable. The LAMs can be legacy DOCSIS or EuroDOCSIS cable modems. The MAC implements the minimum functionality of a legacy DOCSIS MAC and other DOCSIS functionalities to initialize and register the DOCSIS or EuroDOCSIS cable modems. LAMs with multiple DOCSIS or EuroDOCSIS channels can be accommodated by enhancing the MAC with multi-channel features of a full-service MAC (fsMAC). Cable TV programming channels and the BLAN can shared the same cable spectrum.

In its simplest form, each LAM has an Ethernet or USB outlet for interfacing to in-room Internet appliances or other CPE (customer premises equipment) devices. More advanced versions of the LAMs have other CPEs embedded.

The QoS required by different applications such as voice, video and data can be easily accommodated by the LAMC because all transmissions to and from the LAMs are controlled and allocated by the LAMC according to the QoS needs of the applications. The capacity can be expanded according to need by adding the number of channels, limited only by the spectrum availability and cost of implementation.

In accordance with still another aspect of the present invention, if backward compatibility with legacy DOCSIS or EuroDOCSIS cable modems is not required, further simplification of the LAMC and LAMs are possible to reduce the cost and streamline the initialization and registration process. Furthermore, downstream channels can also be located beyond the DOCSIS or EuroDOCSIS frequency range for coexistence with conventional cable TV programming channels.

The wide-area HFC cable modem and RG functionalities can be embedded into the LAMC so that the HFC cable modem downstream channels can be easily identified and be reused by the BLAN. Alternatively the LAMC downstream channels can be allocated by the cable operator, thus avoiding conflict with cable TV programming channels. The upstream spectrum is isolated by the wideband HFC cable modem and thus can be reused by the local area modems (LAMs).

To preserve the cable TV programming channels, downstream channels identified to be used for the BLAN are filtered out before combining with the LAMC-generated downstream channels and the LAMs-generated upstream channels.

Although this invention is described herein in terms of a coaxial cable medium, any other shared medium with point-to-multipoint topology in a local area environment such as wireless, power-line, or passive optical fiber can be benefited by the teachings of this invention.

DETAILED DESCRIPTION

Figure 1:
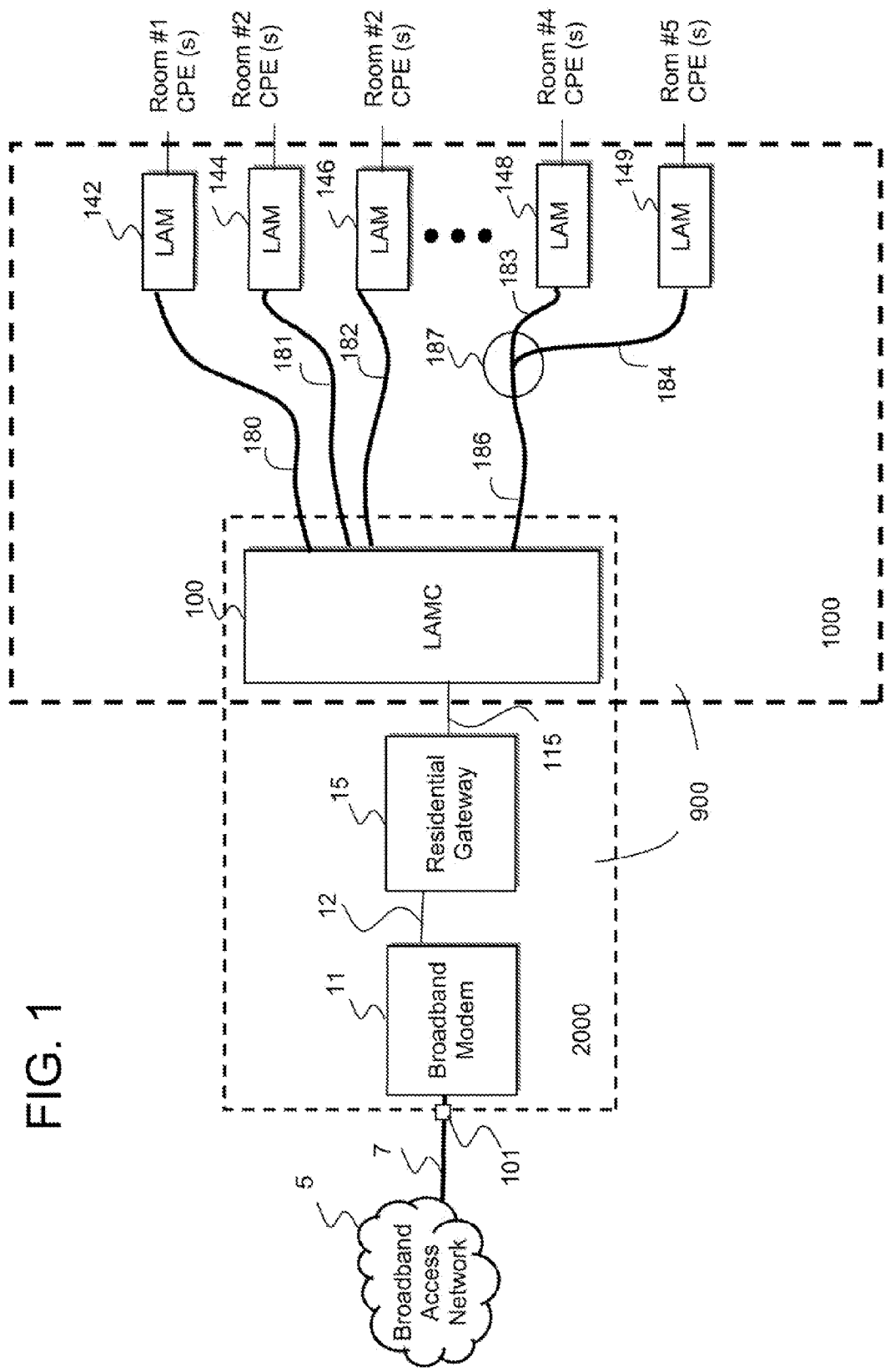
FIG. 1 is a high-level block diagram of a broadband local area network system for a coaxial cable medium.

Referring to FIG. 1, a high level block diagram of a broadband local area network system based on coaxial cable is shown. A broadband service provider's access network 5 provides high-speed Internet access, digital video and voice-over-Internet Protocol (VoIP) services to the residence through a broadband modem 11 located on premises 900. Entry for the broadband service is through cable 7 to a point-of-entry 101. Examples of broadband modems include: DOCSIS/EuroDOCSIS cable modems for hybrid-fiber-coax (HFC), various versions of digital subscriber line (DSL) modems, fiber-to-the-premises (FTTP) modem, fixed or wideband wireless modem, and two-way satellite modem.

The broadband modem 11 is typically connected to a Residential Gateway (RG) 15, which is in turn connected to a coaxial cable broadband local area backbone network 1000.

The exemplary home backbone network 1000 comprises of a local area modem controller (LAMC) 100 and coaxial cable segments 180, 181, 182, and 186. The cable 186 is further split into cable segments 183 and 184 through a splitter 187. Each of the cable segments 180, 181, 182, 183, and 184 is respectively connected to a local area modem (LAM) 142, 144, 146, 148, and 149 in each room (in this example, there are five rooms in the premises being networked). Each of the LAMs has at least an Ethernet interface available for interfacing to Internet appliances or customer premises equipment (CPEs) in the room.

In another embodiment, the broadband modem 10, and/or RG can be embedded into the LAMC 100 (shown as block 2000 in FIG. 1) to further optimize the performance, functionality and cost.

Figure 2:
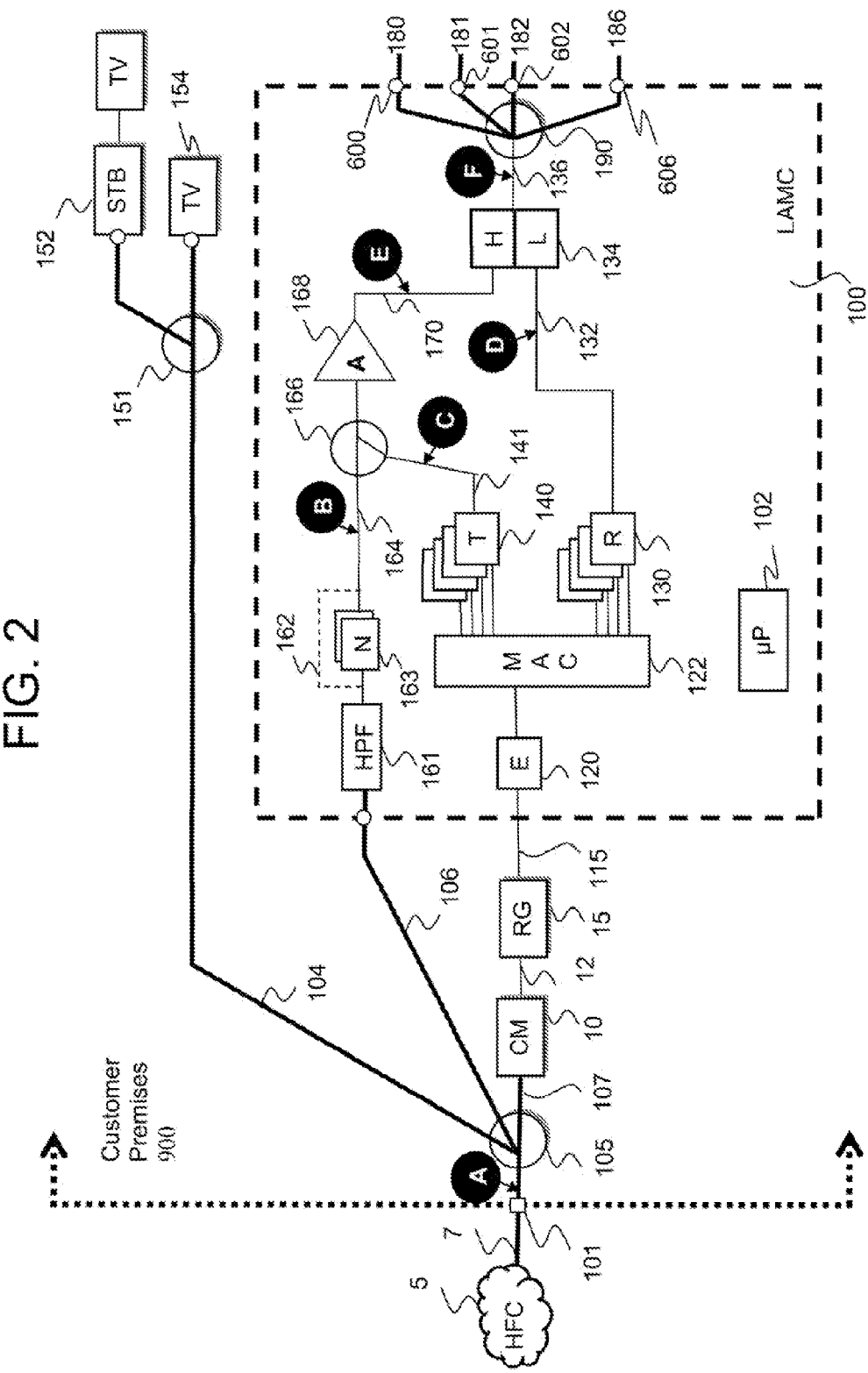
FIG. 2 is a block diagram of a preferred embodiment of a broadband coaxial local area backbone network with a wide-area HFC cable modem; it also shows the details of a local area modem controller (LAMC).

Preferred Embodiment of Home Backbone with Cable TV and Cable Broadband Provider FIG. 2 is a preferred embodiment of the present invention for the broadband coaxial cable home network that also uses DOCSIS or EuroDOCSIS cable modem and cable TV programming services.

Referring to FIG. 2, cable TV programming channels and DOCSIS or EuroDOCSIS cable modem channels of the wide-area HFC broadband access network 5 enter the premises 900 through the point-of-entry 101 via the coaxial cable 7. In the premises, the RF signal in the coax 7 is further splitted by splitter 105 into three paths: legacy coax 104, coax to LAMC RF input 106, and coax to wide-area HFC DOCSIS or EuroDOCSIS cable modem RF input 107.

The legacy coax 104 is further divided by splitter 151 to support legacy devices such as a legacy set-top box 152 and a legacy analog TV 154. The coax path 104 is used to ensure full backward compatibility of existing legacy devices and no home network support is needed in that area of the premises. The coax path 104 is not essential to the operation of this broadband local area network, but is included for clarity and completeness.

The coax path 107 is connected to a conventional wide-area HFC DOCSIS or EuroDOCSIS cable modem 10, which is further connected to a residential gateway (RG) 15 via a network interface 12 such as an Ethernet CAT-5 cable or USB. The RG 15 typically performs packet filtering, NAT address translation, firewall, and other security and routing/bridging functions; and forwards the packets to and from the home backbone network 1000, via a network cable 115, to a network interface 120 coupled to a media-access-control (MAC) function 122.

The MAC 122 coordinates the forwarding of packets between multi-channel transmitter(s) 140 and multi-channel receiver(s) 130. The MAC 122 also arbitrates upstream multiple-access packet transmissions from two or more of the local access cable modems (LAMs) 142, 144, 146, 148 and 149; and schedules packet transmissions downstream and upstream to achieve the quality of service required by applications.

The MAC 122 can be implemented with both digital logic hardware, and/or software programs under the control of one or more microprocessors 102.

Each of the channels of the multi-channel transmitter(s) 140 and receiver(s) 130 can be, but not limited to, one of the following types:

Conventional DOCSIS/EuroDOCSIS QAM channel,

Conventional DOCSIS/EuroDOCSIS ATDMA/S-CDMA channel.

Wideband channel consisted of two or more DOCSIS/EuroDOCSIS channels being bonded or aggregated, Wideband channel using channel bandwidth wider than conventional DOCSIS/EuroDOCSIS channels, Wideband channel that uses OFDM modulation scheme, Wideband channel that uses carrier-less modulation schemes such as UWB (ultra-wideband) and SDM (Sub-band Division Modulation) with wavelet filters.

These physical layer technologies are well-known in the art and will not be repeated here.

One skill in the art will use various combinations of the number of channels and modulation types to optimize for Silicon cost, spectral efficiency and performance. In one example, a broadband LAN with two DOCSIS or EuroDOCSIS downstream and two upstream channels provides about 80 Mbps/60 Mbps in the downstream and upstream directions respectively, sufficient for most full-service multimedia audio-visual streaming, voice and data communications within a digital home.

Depending on the advance of Silicon and DSP technology, the LAMC 100 can be scaled with many channels up to the entire upstream and downstream spectrum available for the broadband home network.

Downstream Channels Insertion

Since the downstream spectrum of a conventional HFC network is occupied by cable TV video programming channels and DOCSIS/EuroDOCSIS channels, and the upstream spectrum of a conventional sub-split HFC plant is occupied by DOCSIS/EuroDOCSIS upstream channels (and perhaps other reverse channels for applications such as plant monitoring and legacy pay-per-view), occupied channels must be freed up for use in the home backbone network.

Channels can be made available (but not limited to) by one of the following methods:

(1) The cable service provider assigns downstream channel(s) for home networking. In this case, there is no conflict with the channel line-up. The downstream channels are tuned to the assigned channel frequencies and are inserted into the downstream spectrum. Notch filter(s) 163 can be bypassed via RF path 162.

(2) If no cable TV programming is subscribed, the entire cable TV downstream spectrum (54-870 MHz in DOCSIS, 65-870 MHz in EuroDOCSIS) can be used for home networking without conflict.

(3) Reuse the downstream channel(s) used for the DOCSIS/EuroDOCSIS cable modem 10. The DOCSIS/EuroDOCSIS downstream channel profile(s) can be learned by either the cable modem 10 or LAMs, and are then communicated to the MAC 122 via signaling.

(4) Notch out the downstream channel(s) needed for home networking at channel frequencies not currently used for other in-premises cable-ready devices, which are also connected to the home network.

(5) Use channels outside the cable TV band (typically above 870 MHz depending on the HFC network). However, in this case, conventional DOCSIS/EuroDOCSIS cable modems cannot be used for LAMs.

(6) The upstream spectrum (5-42 MHz for DOCSIS or 5-65 MHz for EuroDOCSIS) is reused in the home network without interference because the upstream spectrum is isolated by the cable modem 10 and a high-pass filter 161.

Still referring to FIG. 2, cable TV programming channels will be notched out by the channel notch a filter 163 (or filters 163 if the channel used for home networking not contiguous) after filtering the programming channel RF signal 106 through the high-pass filter 161. As described above, the notch filter(s) 163 can be bypassed by RF path 162 if the channels are available for use without conflict to the programming channels.

Notch filter output 164 merges with the output from one or more transmitters 140 via path 141, using a combiner 166. Combined downstream signal from 166 is then amplified by RF amplifier 168, and merged via path 170 with upstream receiver(s) path 132 in diplexer 134.

The output of the diplexer 134 is distributed to the rest of the premises via splitter 190 to F-connectors 600, 601, 602, and 606, which are connected to the in-premises coaxial cable segments (typically RG 59) 180, 181, 182, and 186 respectively. Each cable segment typically has a length of up to 250 to 300 feet and each cable segment is typically terminated by a conventional F-type connector in a wall outlet (not shown).

Each cable segment is coupled to a LAM for home networking operation. However, the cable segment can also be connected to a legacy set-top box or an analog TV.

Preferred Embodiment of the Local Area Modem (LAM)

There are typically three types of LAMs:
  (1) Conventional DOCSIS/EuroDOCSIS cable modems with a single downstream-upstream channel-pair;
  (2) Enhanced cable modems with multiple DOCSIS/EuroDOCSIS channels;
  (3) Enhanced cable modems with a mix of DOCSIS/EuroDOCSIS channels, one or more wideband channels.

Figure 3:
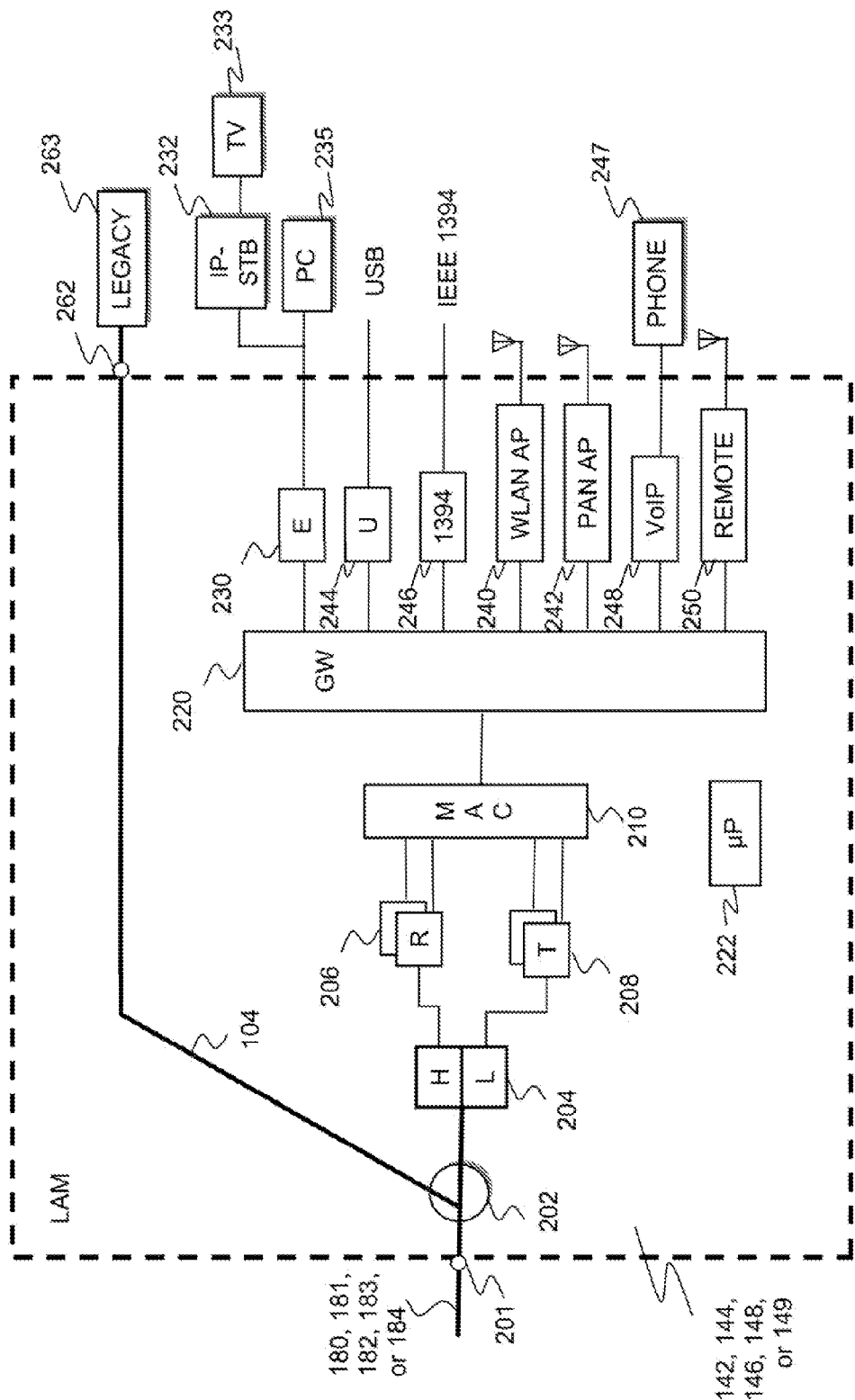
FIG. 3 is a detailed diagram of an exemplary implementation a local area modem (LAM) embedded with CPE devices and networking interfaces.

Referring to FIG. 3, a preferred embodiment of one of the LAMs (142, 144, 146, 148 or 149 in FIG. 1) is detailed. The incoming RF signal in the coaxial cable segment 180, 181, 182, 183, or 184 enters the LAM via input F-connector 201, and is then splitted by splitter 202.

One path 104 goes to output F-connector 262 for connection to an external legacy cable-ready device such as analog TV, legacy digital or analog set-top box 263.

The other path from the splitter 202 is coupled to a diplex filter 204, which separates downstream channels from upstream channels.

The downstream channels are coupled to multi-channel receiver(s) 206 that are tuned to the matching transmitter(s) 140, for demodulation, decoding, error correction and formatting and other physical layer processing to recover packets received. The packets are then forwarded to MAC 210 for further processing.

Packets destined to the LAMC 100 are forwarded by the MAC 210 to multi-channel upstream transmitter(s) 208, and are merged with the downstream RF in the diplex filter 204. The transmitter(s) 208 performs formatting, encoding, modulation, up-conversion and other processing for transmitting to the matching receiver(s) 130 in the LAMC 100.

The MAC 210 can be implemented using one or more microprocessors 222 with control programs and other hardware to perform media access control (MAC) functions. The MAC 210 forwards packets, through a gateway function 220, to and from embedded network functions 230, 244, 246, 240 and 242, or CPE devices such as VoIP phone adapter 248, or remote control receiver 250.

Note that in its simplest form, the LAM is implemented with at least one network interface such as the Ethernet interface 230. Other embedded functions are implemented as required. The exemplary embedded network functions and CPEs in FIG. 3 are listed below:

(1) The Ethernet bridge 230 connecting to an external Internet Protocol (IP) set-top box 232 for delivering audio-visual programs to a conventional television 233, and connecting to a personal computer 235 for access to high-speed Internet;

(2) The USB Bridge 244 for connecting to popular USB peripherals;

(3) The IEEE 1394 Bridge 246 for connecting to IEEE 1394 enabled devices;

(4) The wireless LAN (Local Area Network) Access Point 240, for in-premises communications;

(5) The wireless PAN (Personal Area Network) Access Point 242, for in-room, short-range, ultra-high-speed communications;

(6) The voice-over-IP telephone adapter 248 that interfaces to a conventional telephone 247;

(7) The low-cost wireless remote control receiver 250, working with a matching wireless remote control transmitter (not shown), useful for receiving video-on-demand commands for one way digital set-top boxes.

The gateway 220 performs functions such as bridging, switching, routing, and filtering among the external network interface devices and the home backbone network. The gateway functions can be implemented in a separate microprocessor or in the microprocessor 222.

Exemplary Channel Plan for the Broadband Local Area Backbone Network

Figure 4:
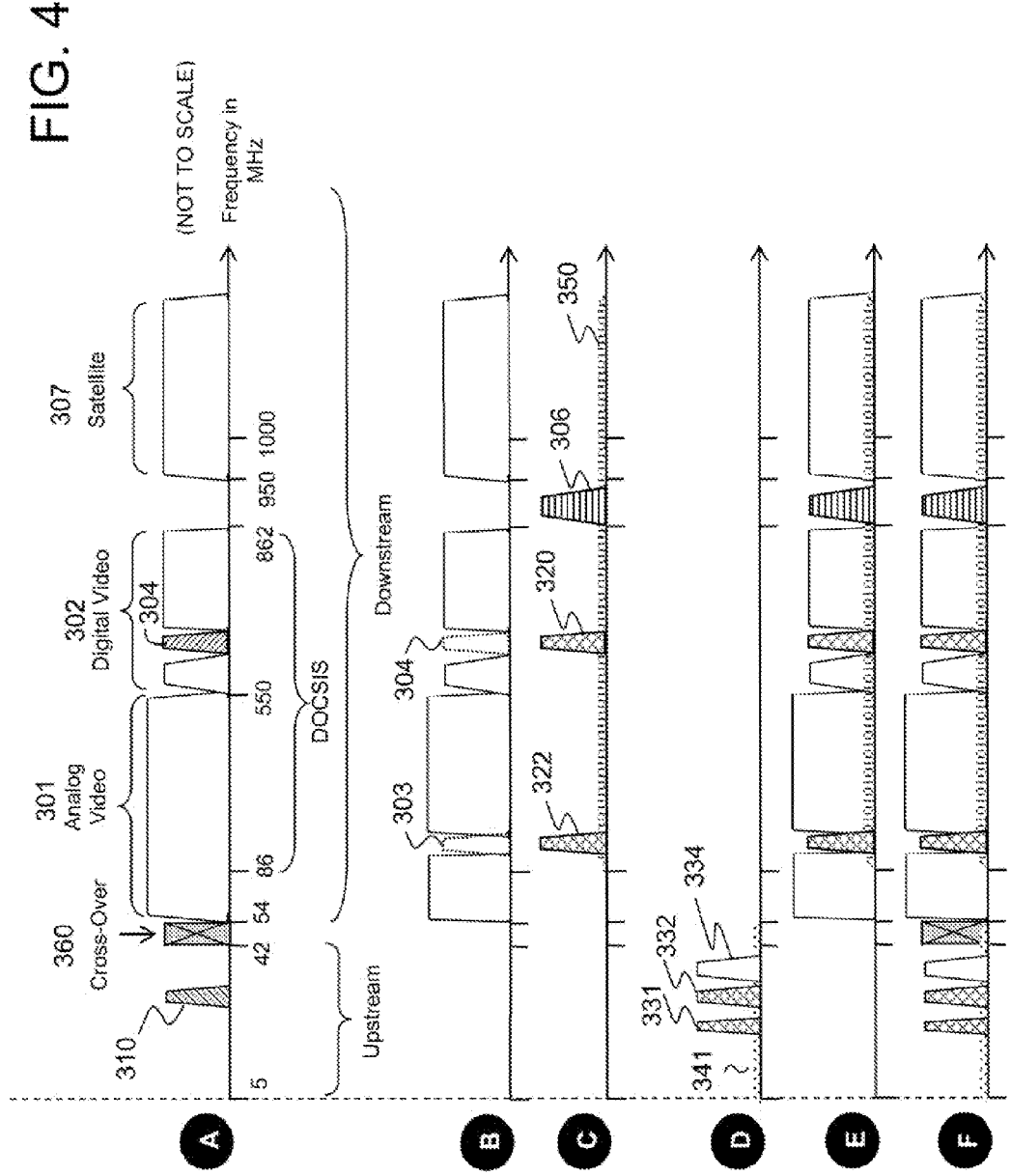
FIG. 4 shows channel line-ups at various test points identified in FIG. 2; it also shows how the downstream and upstream channels reuse the cable TV channels.

FIG. 4 depicts an exemplary spectrum usage of the coaxial broadband home backbone network 1000 using multiple upstream and downstream DOCSIS/EuroDOCSIS, wideband and ultra-wideband channels. Referring back to FIG. 2, RF signal test points A, B, C, D, E, and F correspond to the paths 7, 164, 141, 132, 170, and 136 respectively.

Referring to FIG. 4, the test point A shows the spectrum of the sub-split two-way HFC cable plant 5 comprising an upstream DOCSIS channel 310 and a downstream DOCSIS channel 304. The sub-split spectrum has a cross-over frequency band 360 from 42 to 54 MHz. Upstream frequency band is from 5 to 42 MHz. Typically the downstream spectrum for the HFC (54 to 870 MHz) is divided into an analog video channels band 301 (typically from 54 to 550 MHz) and a digital video channels band 302. A Satellite band 307 typically occupies frequencies greater than 950 MHz. A DOCSIS frequency band spans from 86 to 862 MHz.

The test point B shows the downstream spectrum after removing the upstream channels via the high-pass filter 161; and removing the wide-area HFC DOCSIS downstream channel 304, and removing another downstream channel 303 in the DOCSIS downstream frequency band 301 using the notch filters 163. The notched-out channels 303 and 304 will be used by the broadband LAN.

The test point C is the spectrum showing LAMC 100-generated DOCSIS downstream channels 322 and 320, a wideband downstream channel 306, and an ultra-wideband (UWB) downstream channel 350. Note that UWB channel can span to frequencies beyond 1 GHz but can coexist with the carrier-based channels.

The test point D is the spectrum showing LAM-generated DOCSIS upstream channels 331 and 332, a wideband upstream channel 334, and an ultra-wideband upstream channel 341.

The test point E shows the combined downstream spectrum with the LAMC 100-generated downstream channels 322, 320, 306 and 350, the cable TV programming channels bands 301 and 302, and the Satellite channels band 307.

Finally the test point F shows the combined spectrum with the LAMC 100-generated downstream channels 322, 320, 306 and 350, the LAMs-generated upstream channels 331, 332, 334 and 341, the cable TV programming channels bands 301 and 302, and the Satellite channels band 307. This is the spectrum that each of the LAMs sees at its RF interface to the local area coaxial network.

Coexistence of LAMs with Various Multi-Channel Capabilities

Figure 5:
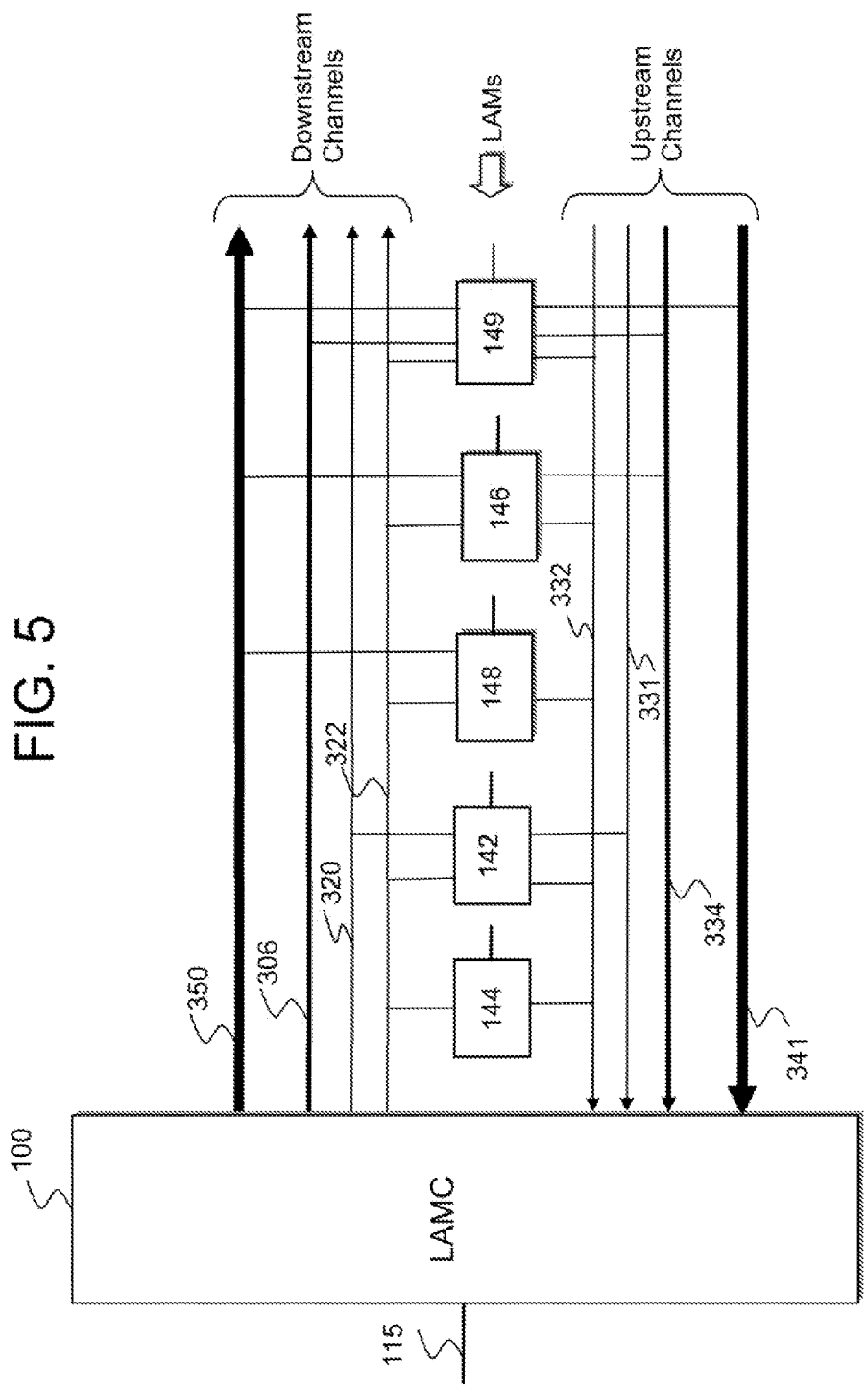
FIG. 5 logically shows the coexistence of legacy cable modems and enhanced LAMs with various multi-channel capabilities.

FIG. 5 further illustrates how the LAMs with different channel capabilities coexist in the multi-channel broadband LAN environment. Logical channels connections are shown FIG. 5.

The LAM 144 is a conventional DOCSIS cable modem that is tuned to the DOCSIS channels 322 and 332.

The LAM 142 is capable of supporting an additional DOCSIS channel-pair 320 and 331, in additional to the DOCSIS channel-pair 322 and 332.

The LAM 148 is tuned to the ultra-wideband downstream channel 350 to provided extra throughput for fast download applications, in additional to the DOCSIS channel-pair 322 and 332.

LAM 146 is tuned to the ultra-wideband downstream channel 350, and is tuned to transmit in the additional upstream channel 334, in additional to the DOCSIS channel-pair 322 and 332, providing ultra-high speed in both the downstream and upstream directions.

LAM 149 is tuned to the ultra-wideband downstream channel 350, the wideband downstream channel 306, and is tuned to transmit in the additional upstream channel 334 and the upstream ultra-wideband channel 341, in additional to the DOCSIS channel-pair 322 and 332, providing ultra-high speed in both the downstream and upstream directions.

Note that the configuration shown in FIG. 5 is exemplary only, many other combinations are possible. In any case, different types of LAMs can coexist in the multi-channel home network environment. Since all LAMs have a common DOCSIS channel-pair, they can be discovered and configured under the control of the multi-channel MAC 122 in the LAMC 100.

Multi-Channel Point-to-Multipoint MAC Protocol Operation

The LAMC can implement minimal DOCSIS functionality to accommodate legacy DOCSIS or EuroDOCSIS cable modems with a single upstream and a single downstream channel. Additional functionality beyond DOCSIS needs to be added to accommodate LAMs with additional DOCSIS or EuroDOCSIS channels, wideband channels, UWB channels or channels with other physical layer technologies. There are many combinations and here are three exemplary scenarios:

A) A LAMC with a single DOCSIS or EuroDOCSIS channel-pair and LAMs being legacy DOCSIS or EuroDOCSIS cable modems. Upon power-up or reset, the LAMC establishes a DOCSIS or EuroDOCSIS channel-pair and register all legacy DOCSIS or EuroDOCSIS LAMs using the procedure as described in reference [3 DOCSIS]. The LAMC must implement the necessary protocols such as DHCP server, TOD server, TFTP server and a valid DOCSIS cable modem Configuration File in order to register the DOCSIS or Euro-DOCSIS cable modem before operational. The LAMC in this scenario will implement a subset of the DOCSIS MAC and other CMTS functionalities.

B) LAMC with multiple DOCSIS or EuroDOCSIS channel-pairs and LAMs being legacy DOCSIS or EuroDOCSIS cable modems. Each legacy DOCSIS or EuroDOCSIS cable modem will initialize, range, and register on a DOCSIS or EuroDOCSIS channel-pair. The LAMC can distribute the load by moving the LAMs to different DOCSIS or EuroDOCSIS channel-pairs using DCC (dynamic channel change) protocol. In this scenario, the LAMC will implement a subset of the DOCSIS MAC and other CMTS functionalities. A typical LAMC startup sequence is as follows:

1) Establishes at least one DOCSIS or EuroDOCSIS downstream-upstream channel-pair by broadcasting in each of the downstream channels, a periodic SYNC MAC message, and a periodic UCD and a periodic MAP MAC messages for each of the upstream channels;
2) Performs initializing ranging and registering the DOCSIS or EuroDOCSIS cable modems and the multi-channel LAMs using one of the channel-pairs;
3) Distributes the downstream and upstream bandwidth to the local area modems by moving the cable modems to one of the specific DOCSIS or EuroDOCSIS channel-pairs using DCC MAC messages;
4) Arbitrates upstream multiple access transmissions according to DOCSIS MAC protocol; and
5) Schedule upstream and downstream transmissions according to the DOCSIS MAC protocol.

C) LAMC and LAMs supporting multiple channels of DOCSIS or EuroDOCSIS and non-DOCSIS physical layer types. The channels can be a mix of DOCSIS or EuroDOCSIS channels, wideband channels, ultra-wideband channels, OFDM channels, and, but not limited to, SDM channels. The preferred embodiment is to use the fsMAC technology described in reference [9 Eng]. A typical startup sequence from the LAMC perspective is as follows:

(1) Establishes time synchronization among a LAMC and LAMs by broadcasting in a downstream-control-and-payload channel (DCPC), a periodic SYNC (time-stamp synchronization) MAC Message;
(2) Establishes a fsMAC (full-service media-access-control) domain by broadcasting a periodic MDCD (fsMAC Domain Channels Descriptor) MAC message in the DCPC, thereby identifying the fsMAC domain, downstream channels and upstream channels, with the channel profiles and burst profiles supported by the LAMC;
(3) Initializes the upstream receivers using the channel profiles and burst parameters in step (2);
(4) Calibrates (including ranging, adjusting power, frequency, timing and equalization coefficients) upstream transmitters of the LAMs using MMAP (multi-channel MAP), CEQ (calibration Request), and CRSP (Calibration response) MAC messages;
(5) Initializes the downstream receivers in the LAMs by the channel profiles;
(6) Establishes one of the upstream channel as upstream-control-channel (UCC), designated by an indication in the MDCD message for communicating MAC messages to the LAMC;
(7) Registers the LAMs which now become operational;
(8) Schedules packet transmissions in one or more downstream channels simultaneously or sequentially;
(9) Arbitrates upstream bandwidth requests from one or more LAMs using bandwidth request (BREQ) MAC message; and schedules bandwidth grants using the MMAP messages; each of the grants including an amount of bandwidth granted to the LAM to transmit at a specific time, at one of the upstream channels, and with one of the burst profiles.

If there is a mix of legacy DOCSIS or EuroDOCSIS cable modems and multi-channel LAMs, a designated DOCSIS or EuroDOCSIS channel-pair can be used to register all modems and served as DCPC and UCC channel-pair for MAC messages.

The initialization can be simplified if legacy DOCSIS or EuroDOCSIS CM supported is not needed. A simpler layer-2 forwarding model can be used in the home backbone network. Provisioning servers such as DHCP, TFTP, TOD, and configuration files may be replaced by a simplified provisioning method.

Alternatively, other point-to-multi-points MAC protocols similar to DOCSIS or fsMAC can be modified to use in the broadband local area network. Examples are: IEEE 802.16 fixed wireless protocol and IEEE 802.3ah Multi-Point Control Protocol.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included with the scope of the claims append hereto.

What is claimed is:

1. A method for sharing an upstream radio-frequency spectrum and a downstream radio-frequency spectrum occupied by a plurality of downstream Cable TV channels and a plurality of downstream and upstream cable modem channels for operating a broadband coaxial local area network (LAN) comprising the steps of:
   (a) isolating said upstream radio-frequency spectrum for said cable modem channels by a high-pass filter;
   (b) identifying one or more downstream radio-frequency spectrum Cable TV channels to be used for LAN operation;
   (c) removing said downstream radio-frequency spectrum cable TV channels identified in step (b) by one or more notch filters;
   (d) inserting one or more LAN-generated downstream radio-frequency spectrum channels into said downstream radio-frequency spectrum by a combiner;
   (e) merging one or more LAN-generated upstream radio-frequency spectrum channels with one or more of said LAN-generated downstream radio-frequency spectrum channels by a diplexer; and
   (f) distributing said combined upstream radio-frequency spectrum channels and downstream radio-frequency spectrum channels from said diplexer to one or more broadband LAN coaxial cables by one or more splitters;
thereby enabling a local modem termination system to communicate with a plurality of local modems utilizing said LAN-generated downstream and LAN-generated upstream channels; while sharing said downstream radio-frequency spectrum with remaining said cable TV channels.

2. The method of claim 1, wherein after step (d), output from said combiner is amplified before merging with said LAN-generated upstream radio-frequency spectrum channels by said diplexer in step (e).

3. The method of claim 1, wherein in step (b), said downstream radio-frequency spectrum channels identified for LAN operation are selected from downstream radio-frequency spectrum channels used for wide-area cable modem operation, or assigned by a service provider, or are channels not in use, or are channels not currently in use for cable TV programming.

4. A circuit for enabling a local area modem controller (LAMC) to communicate with a local area modem (LAM) in a coaxial broadband point-to-multipoint shared media local area network (LAN) comprising: two or more downstream transmitters; one or more upstream receivers; a diplexer; a splitter;
   a media-access-control (MAC) controller coupled to said two or more downstream transmitters, and said one or more upstream receivers;
   wherein downstream radio-frequency spectrum channels from said downstream transmitters are combined with cable TV channels and then merged with LAN-generated upstream channels from said LAM in said diplexer, and output from said diplexer then being distributed to said LAM via said splitter and a coaxial distribution network, wherein said MAC is further coupled to an external network interface.

5. The circuit of claim 4 wherein one or more designated downstream radio-frequency spectrum cable TV channels are removed using one or more notch filters before combining one or more downstream radio-frequency spectrum channels with a combiner.

6. The circuit of claim 4 wherein an upstream radio-frequency spectrum used for said external wide-area modem is filtered out by a high-pass filter, in addition to the removal of one or more designated downstream radio-frequency spectrum cable TV channels.

7. The circuit of claim 4, wherein said combined output of cable-TV channels and MAC transmitter channels is amplified before merging with said LAN-generated upstream channels in said diplexer.

8. The circuit of claim 4, wherein said downstream radio-frequency channels for LAN operation are filtered from said CATV radio-frequency channels before merging with said LAN-generated radio-frequency channels.

9. The circuit of claim 4, wherein said external network interface is a conventional RJ-45 Ethernet Interface.

10. The circuit of claim 4, wherein said MAC is coupled to one or more of the following broadband access devices: a residential gateway, a cable modem, a DOCSIS cable modem, an Euro-DOCSIS cable modem, a DSL modem, a Fiber-to-the-Premises modem, two-way satellite modem, and wireless modem.

11. The circuit of claim 10, wherein said cable modem, or DOCSIS cable modem, or Euro-DOCSIS cable modem is coupled to a Hybrid-Fiber-Coaxial network.

12. A circuit for enabling a local area modem (LAM) to communicate with a local area modem controller (LAMC) in a coaxial broadband point-to-multipoint shared media local area network (LAN) comprising: two or more downstream receivers; one or more upstream transmitters; a diplexer; a splitter;
   a media-access-control (MAC) controller coupled to said two or more downstream receivers, and said one or more upstream transmitters; wherein said receivers and said transmitters are further coupled to said diplexer, which is further coupled to a coaxial cable of said broadband LAN network; wherein said downstream receivers are tuned to LAN-generated downstream channels for said LAN;
   wherein said coaxial cable is coupled to said broadband LAN network through said splitter, wherein said splitter having one or more outputs for Cable-TV devices.

13. The circuit of claim 12 wherein said MAC controller is further coupled to a gateway function, which is further coupled to one or more network interfaces selected from the list of interfaces consisting of: an Ethernet interface, an USB interface, an IEEE 1394 interface, a Wireless LAN Access Point interface, a Voice-Over-IP telephony interface, and a remote control interface.

14. The circuit of claim 13, wherein said Ethernet interface is coupled to an Internet-Protocol set-top box.

15. The circuit of 12, wherein said MAC is simultaneously coordinating share-media access of said multiple downstream and upstream channels.

16. An apparatus for sharing an upstream radio-frequency spectrum and a downstream radio-frequency spectrum occupied by a plurality of downstream cable TV channels and a plurality of downstream and upstream cable modem channels for operating a broadband coaxial local area network (LAN) comprising:
   (a) a high-pass filter for isolating said upstream radio-frequency spectrum for at least one cable modem;
   (b) means for identifying said one or more downstream radio-frequency spectrum cable TV channels to be used for LAN operation;
   (c) one or more notch filters removing said downstream radio-frequency spectrum cable TV channels identified in step (b);
   (d) a combiner inserting one or more LAN-generated downstream channels into said downstream radio-frequency spectrum;
   (e) a diplexer merging one or more LAN-generated upstream radio-frequency spectrum channels with one or more of said LAN-generated downstream radio-frequency spectrum channels,
   (f) one or more splitters distributing said combined upstream radio-frequency spectrum channels and downstream radio-frequency spectrum channels from said diplexer to one or more broadband LAN coaxial cables;
   thereby enabling a local modem termination system to communicate with a plurality of local modems utilizing said LAN-generated downstream and LAN-generated upstream channels; while sharing said downstream radio-frequency spectrum with remaining said cable TV channels.

17. The apparatus of claim 16, wherein after step (d), output from said combiner is amplified before merging with said LAN-generated upstream radio-frequency spectrum channels by said diplexer in step (e).

18. The apparatus of claim 16, wherein in step (b), said downstream radio-frequency spectrum channels identified for LAN operation are said downstream radio-frequency spectrum channels used for said cable modem.

19. The apparatus of claim 16, wherein in step (b), said downstream radio-frequency spectrum channels identified for LAN operation are assigned by a service provider, or are channels not in use, or are channels not currently in use for cable TV programming.

* * * * *